Dec. 12, 1967
M. L. CRIPE
3,357,311
SERVOMOTOR SYSTEM
Filed Oct. 11, 1965
3 Sheets-Sheet 1
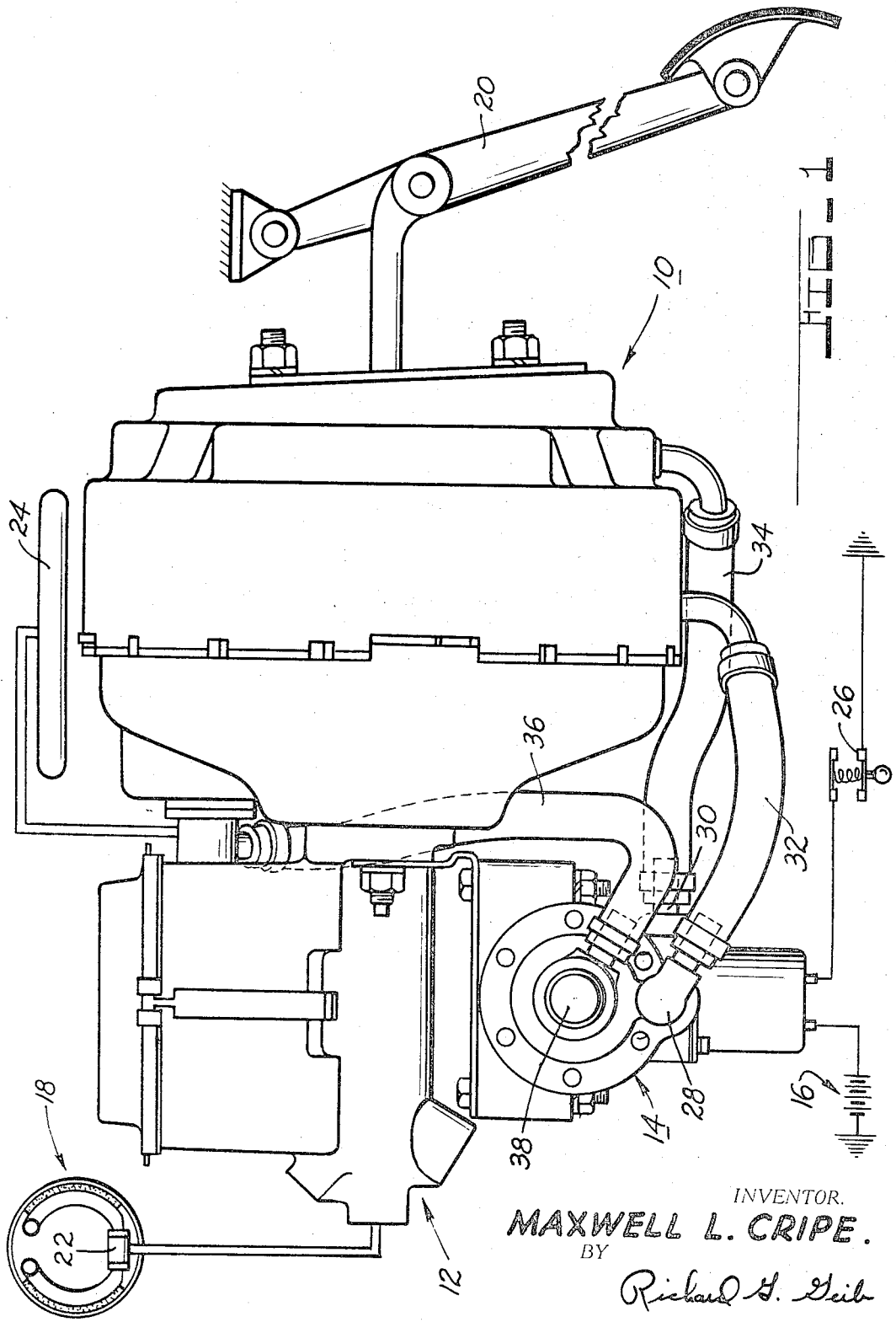
INVENTOR.
MAXWELL L. CRIPE.
BY
Richard G. Geib
ATTORNEY.

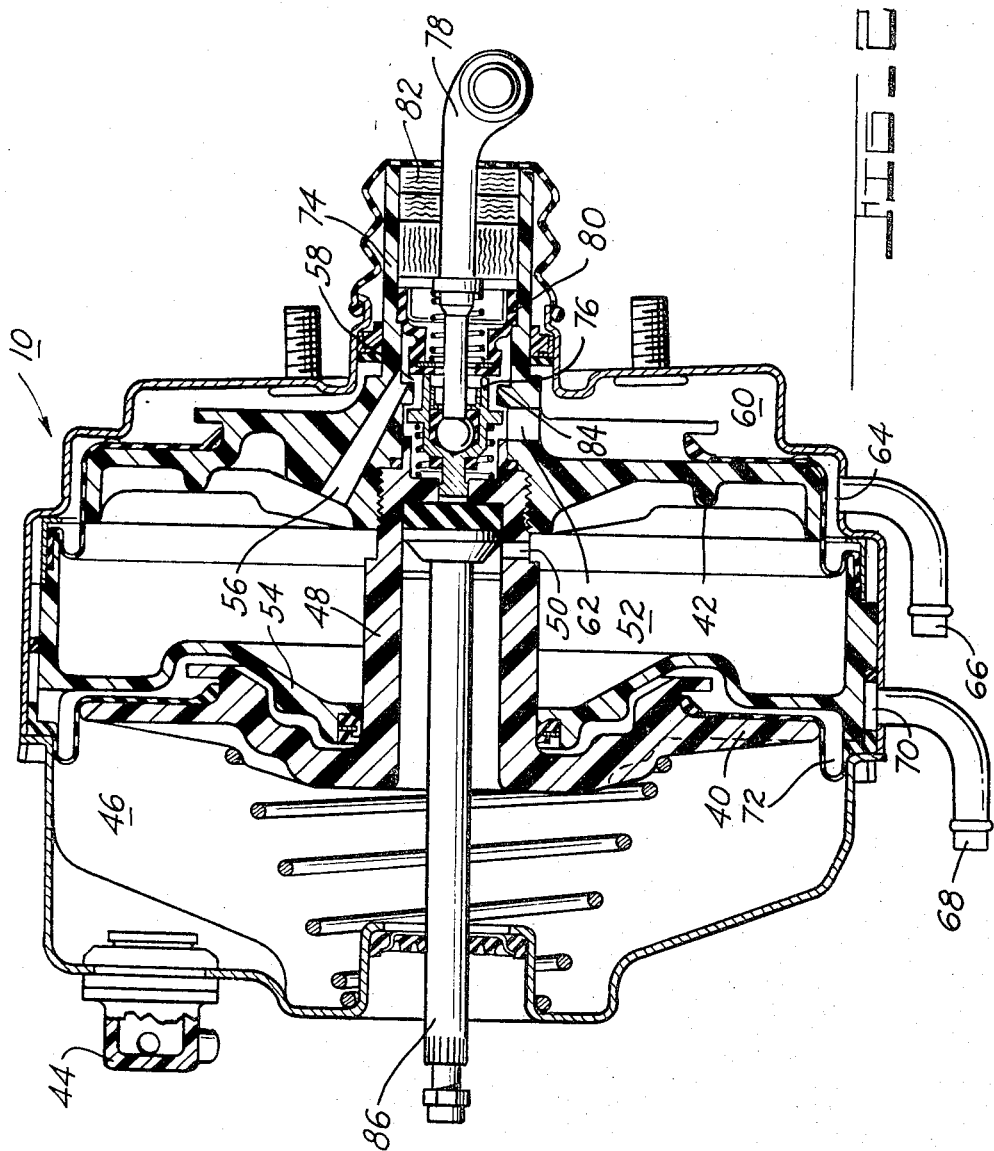

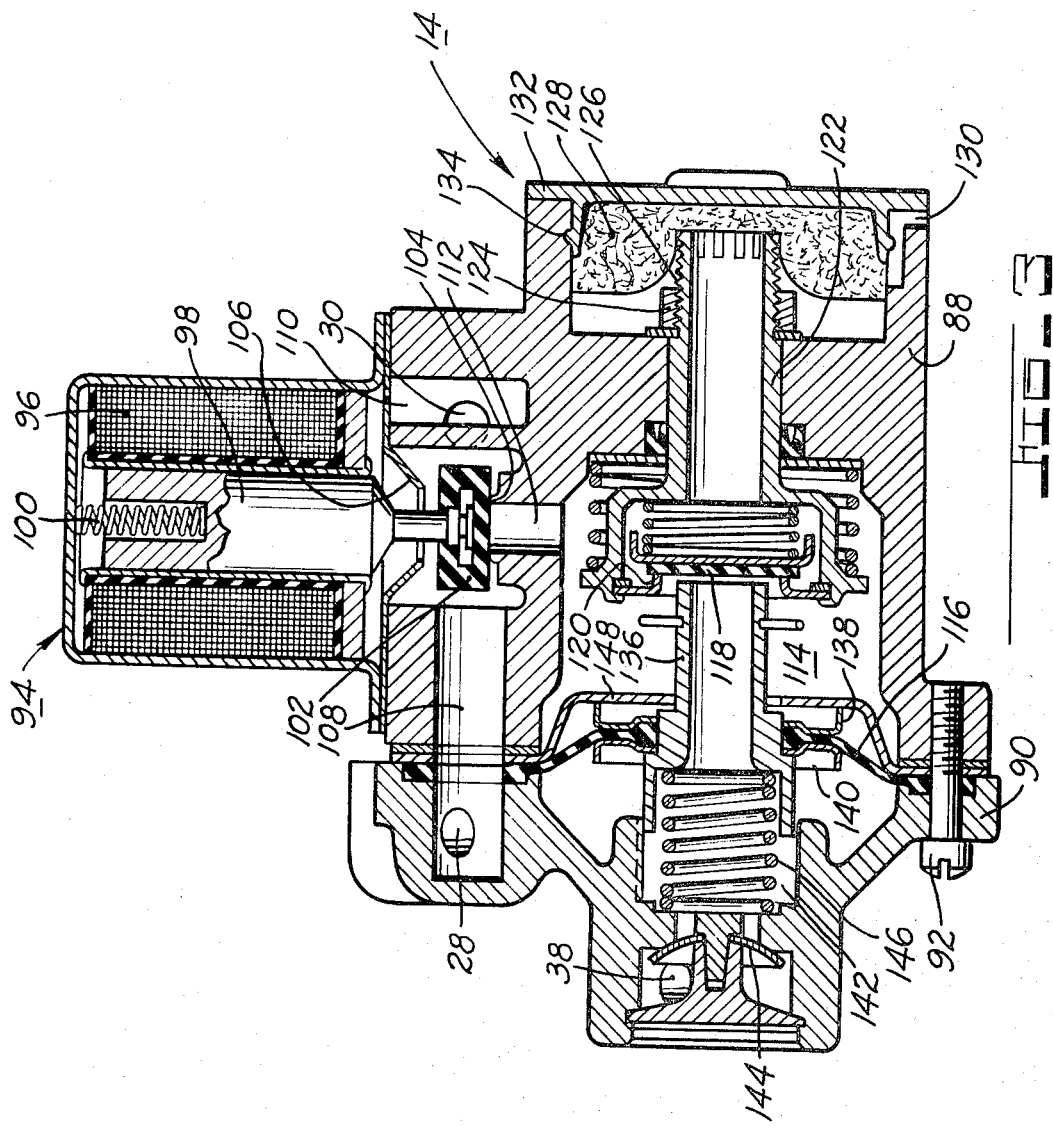

United States Patent Office 3,357,311
Patented Dec. 12, 1967

3,357,311
SERVOMOTOR SYSTEM
Maxwell L. Cripe, South Bend, Ind., assignor to The Bendix Corporation, a corporation of Delaware
Filed Oct. 11, 1965, Ser. No. 494,581
13 Claims. (Cl. 91—32)

ABSTRACT OF THE DISCLOSURE

In combination with a fluid pressure servomotor a valve that is remotely actuated, as by an electrical switch, to control one chamber of the servomotor so that braking can be accomplished by either a brake pedal connected to a valving mechanism internally of the servomotor to the full extent possible or by the switch to a lesser extent.

---

This invention relates to a fluid pressure servomotor system having provisions enabling limited actuation of the servomotor portion thereof.

In servomotor systems operable in conjunction with other controls it has been observed that occupation with all the controls available to an operator thereof reduces the efficiency and interferes with the diligence of the operator. It is therefore a principal object of this invention to provide a servomotor system which is actuatable by at least two controls to reduce, if not eliminate, these problems.

It is a further object of this invention to provide a servomotor system with control means that will permit limited actuation of a servomotor by simple remote means to provide time for transition between operation of other controls and that control which will fully actuate the same servomotor system.

Another object of this invention is to provide electrically operable valving for a servomotor system in conjunction with manual control means for the same servomotor.

Other and more detail objects of this invention will appear to those skilled in the art to which this invention applies from the following description of the drawings in which:

FIGURE 1 is a schematic servomotor system in accordance with the principles of this invention;

FIGURE 2 is a cross section of a servomotor construction usable with the system embodying the principles of my invention; and FIGURE 3 is a cross section of an electrical valve mechanism used in this presentation showing the principles of my invention.

With particular regard to FIGURE 1 there is shown a a servomotor system including a fluid pressure motor 10, a pressure generating cylinder 12, a solenoid valve 14, an electrical system 16 and a pressure responsive mechanism 18. In more detail there is shown a power brake system for an automobile which is, as usual, normally actuated by moving a brake pedal 20 to create a pressure differential in the motor 10. This then moves a piston, not shown, in cylinder 12 to displace fluid to a brake 18 causing a wheel cylinder 22 to actuate the brakes of the automobile. The motor 10 is supplied with a vacuum pressure from a manifold 24.

In reality the conventional power brake system is improved upon by the addition of the solenoid valve 14 that is also capable of actuating motor 10 whenever a button type switch 26 is closed. More particularly, whenever switch 26 is actuated, vacuum communication to port 28 from port 30, via a pair of hoses 32 and 34 is prevented by the valve 14. Furthermore, valve 14 schedules atmospheric pressure to port 28 to actuate the motor 10 and thence wheel cylinder 22. Before passing on to a detailed description of the motor and valve, it should be noted that vacuum pressure from manifold 24 is communicated by conduit 36 to a vacuum port 38 in the valve 14 and directed internally thereof to act across a diaphragm 116 in opposition to the force of a spring 146. This permits, as described below, a predetermined limitation of the actuation of motor 10.

Now with regard to FIGURE 2, the motor 10 is shown to be of a tandem variety having a forward movable wall 40 and a rearward movable wall 42. At rest, this motor is vacuum suspended in that vacuum from manifold 24 passes through a check valve 44 into a vacuum storage chamber 46 thence through a tubular and rearward projection 48 of wall 40 to a radial passage 50 and into a second vacuum storage chamber 52 between a partition 54 and wall 42. From chamber 52 the vacuum pressure is communicated by way of passage 56 to a valve chamber 58 thence to a first control chamber 60 by way of passage 62.

To trace the flow path further, vacuum or control pressure in chamber 60 passes to a port 64 in the side of motor 10 to a hose connection 66 to which hose 34 is connected. This communicates vacuum to port 30 in valve 14 and, so long as valve 14 is not electrically actuated, to port 28 and hose 32 to hose connection 68 and port 70 to a second control chamber 72 in motor 10.

The rear movable wall has a tubular projection 74 mounting a valve means 76 actuatable by a push rod 78 affixed to pedal 20. A flexible poppet valve 80 is affixed about its periphery to projection 74 and abutting valve means 76 to prescribe the valve chamber 58. Atmospheric pressure, therefore, is introduced through an open end 82 of projection 74 and passes internally of the poppet to the valve means which creates a pressure differential across the poppet causing the poppet to follow up the valve means until abutment with an annular valve seat 84 whereupon passage 56 is cut-off from chamber 58 but still around the periphery of poppet 80. Further inward motion of valve means 76 opens chamber 58 to atmospheric pressure creating a pressure differential across wall 42 and via hoses 34 and 32 and valve 14 to chamber 72 creating a similar pressure differential across wall 40. This projects a force transmitting rod 86 to activate cylinder 12, as aforedescribed. Other details of the motor construction can be observed from the copending patent application Ser. No. 416,495 assigned to the common assignee which has now issued into U.S. Patent No. 3,292,-502 dated Dec. 20, 1966. The difference primarily between the construction of this disclosure and that one being in the use of external and/or internal valved means for communicating the control chambers.

As for the valve construction of FIGURE 3, it includes a valve housing formed of two sections 88 and 90 bolted together, as at 92 to which an electrical solenoid 94 having a coil 96 and plunger 98 is attached. As is no doubt familar to those skilled in the art, plunger 98 is biased to be projecting from coil 96 by a spring 100. At its lower end plunger 98 carries a valve member 102, which in the released position shown, is biased against a valve seat 104. In the actuated position, as when button 26 energizes coil 96 to pull in plunger 98, member 102 is raised against another valve seat 106. This seat 106 is assembled with the solenoid to upper housing portion 88 to be between ports 28 and 30 having respective, i.e. separated, passages 108 and 110 leading to seat 106.

The seat 104 surrounds a passage 112 in portion 88 leading to a valve control chamber 114. Chamber 114 is provided in the valve housing by a diaphragm 116 and a spring biased valve 118 resting on a valve seat 120 of a tubular member 122. The tubular member 122 is adjustably positioned through portion 88 by a nut 124 about threads 126 of member 122. Member 122 opens to atmosphere through a filter 128 and a radial opening 130. The cap is snap fitted for ease of assembly and disassembly to portion 88, as by ears 134.

Through the diaphragm, and on the same axis as member 122, another tubular member 136 is mounted, as by clamping plates 138 and 140 riveted or bolted together. This tubular member opens chamber 114 to an underlying vacuum chamber 142 in portion 90 receiving vacuum pressure through check valve 144 from port 38 as above recited. Furthermore, a spring 146 is placed between member 136 and portion 90 to, in absence of sufficient pressure differential across diaphragm 116, keep upturned flanges of plate 138 against a stop plate 148 assembled with and inwardly extending from the juncture of portions 88 and 90.

After determining the required limited braking effort desired of the wall 40 to be controlled by the valve 14, cap 132 is removed and member 122 is held while turning nut 124 thereby driving member 122 inwardly. This will lap member 136, i.e., its upper open end, on valve 118 and raise valve 118 from seat 120 to allow maintenance of sufficient pressure in chamber 114 to accomplish this. In fact, whenever pressure in 114 rises above that required to actuate chamber 72, as set by positioning member 122, to develop a predetermined deceleration for the automobile, a pressure differential is created across diaphragm 116 to oppose spring 146, which pressure differential lowers member 136 to again seat valve 118 on 120 whereupon spring 146 takes over to maintain the desired control pressure for the chamber 72.

If desired, in order to preclude simultaneous operation of the retard system during manual actuation of the power brake servomotor, a switch can be inserted in the electrical circuit between switch 26 and coil 96. This switch would be arranged to be normally closed until actuation of the brake pedal 20 whereupon it would open to interrupt the energization of valve 14. With this arrangement fail-safe full power is provided for manual brake operation.

Having thus described a mode of operation of my invention and the structure accomplishing same, I wish to now set forth the true scope of the invention by the appended claims.

I claim:

1. In a fluid pressure servomotor having a first control chamber and a second control chamber, a means to communicate said control chambers comprising:
  a valve means including a housing having a first pressure supply port, a second pressure supply port, an adjustable pressure responsive valve means operatively arranged to control communication between one or the other of said first and second ports and a control port, a first pressure communication port, a second pressure communication port, a remotely controllable valve poppet operatively arranged to communicate either said first and second pressure communication ports with each other or said control port with said second pressure communication port;
  means communicating said first control chamber to said first pressure communicating port; and
  means communicating said second control chamber to said second pressure communicating port.

2. In a fluid pressure servomotor according to claim 1 wherein said adjustable pressure responsive means may be characterized as including a diaphragm carrying a tubular valve body in open communication to said first pressure supply port and a tubular manually adjustable member carrying a valve seat arranged to normally close one end of said member with the other end open to said second pressure supply port, said valve seat being further located to overlie said tubular valve body such that upon initial contact of said seat and body both said first and second pressure supply ports are closed from said control port and further force on said seat opens said second pressure supply port to said control port whereas movement of said body away from said seat opens said first pressure supply port to said control port, and means to maintain contact of said body and said seat in opposition to a differential pressure regulated by adjustment of the manually adjustable member.

3. For a fluid pressure servomotor according to claim 2 and electrically actuated means for positioning said remotely controllable valve.

4. A fluid pressure motor according to claim 3 wherein said electrically actuated means and said valve means are in the same housing.

5. A valve means according to claim 1 and further characterized as including:
  a valve housing having an internal chamber;
  a diaphragm in said housing dividing said internal chamber into first and second variable volume chambers;
  a first tubular member carried by said diaphragm establishing a flow passage between said variable volume chambers;
  a first flow passageway in said housing in flow communication with first variable volume chamber;
  a second tubular member extending through said housing to establish communication between said second variable volume chamber and the exterior of said housing, said second tubular member being in line with said first tubular member and having valve means on its end adjacent said first tubular member adapted to close said first tubular member and open said second tubular member when said first tubular member is urged against said second tubular member;
  a second fluid passageway in said housing having a first control port and a second control port opening exteriorly of said housing and a third control port intermediate said first and second control ports which third control port opens said second fluid passageway to said second variable volume chamber; and
  a solenoid operated valve means electrically operated to open said third control port and close said first control port to thereby select which of said first or third ports is communicated with said second control port.

6. A valve means according to claim 5 and further comprising a spring biasing said first tubular member into contact with said valve means of said second tubular member.

7. A valve means according to claim 6 and further comprising a means to adjust the position of said second means in said housing to regulate the spacing of the valve means thereof from said first tubular means.

8. A valve means according to claim 5 and further comprising a check valve in said first flow passageway.

9. In a fluid pressure servomotor having first and second movable walls in a housing dividing said housing into first and second control chambers and first and second storage chambers with the first and second control chambers being communicated by conduit means and the first and second storage chambers being communicated by passage means, a valve means for controlling the servomotor, said valve means comprising:
  a first operator-operated valve device operably arranged between the conduit means, the passage means and a pressure source, said first valve device normally maintaining communication of said storage chambers, via the passage means, with the conduit means and upon actuation terminate this communication and subsequently open communication of the pressure source to said conduit means;
  a second operator-operated valve device operatively connected to said conduit means between said first and second control chambers, said second valve device including elements normally permitting communication of said first and second control chambers and actuatable to close this communication while opening communication of a pressure source to one of said first and second control chambers.

10. The structure of claim 9 wherein said first valve device is mechanically controlled and said second valve device is electrically controlled.

11. The structure of claim 9 wherein said second valve device includes a pressure responsive element controlling the magnitude of the power source available from said second valve device.

12. The structure of claim 9 wherein a pressure responsive element is connected to the first and second storage chambers on one side and the pressure source for said first valve device on the other such that the pressure differential thereacross controls the pressure source available from said second valve device.

13. The structure of claim 12 and further comprising a spring biased valve carried by an adjustable tubular member operatively positioning said spring biased valve with respect to said pressure responsive element to bring about the degree of availability of said pressure source from said second valve device.

References Cited
UNITED STATES PATENTS

| | | | |
|---|---|---|---|
| 1,586,705 | 6/1926 | Roucka | 91—447 |
| 2,991,762 | 7/1961 | Price et al. | 137—627.5 |
| 3,073,345 | 1/1963 | Hagler | 91—447 |
| 3,108,615 | 10/1963 | Cripe | 137—627.5 |

MARTIN P. SCHWADRON, *Primary Examiner.*

PAUL E. MASLOUSKY, *Assistant Examiner.*